US012131878B2

(12) United States Patent
Ma et al.

(10) Patent No.: US 12,131,878 B2
(45) Date of Patent: Oct. 29, 2024

(54) VACUUM DEGREE DETECTION DEVICE WITH BURIED ELECTRODES IN VACUUM INTERRUPTER AND METHOD THEREOF

(71) Applicant: XI'AN JIAOTONG UNIVERSITY, Shaanxi (CN)

(72) Inventors: Hui Ma, Shaanxi (CN); Dianyu Chi, Shaanxi (CN); Yu Du, Shaanxi (CN); Jingyu Shen, Shaanxi (CN); Yingsan Geng, Shaanxi (CN); Jianhua Wang, Shaanxi (CN); Zhiyuan Liu, Shaanxi (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 60 days.

(21) Appl. No.: 17/938,908

(22) Filed: Sep. 6, 2022

(65) Prior Publication Data

US 2022/0415595 A1 Dec. 29, 2022

(51) Int. Cl.
*H01H 33/668* (2006.01)
*H01H 33/664* (2006.01)

(52) U.S. Cl.
CPC ........ *H01H 33/668* (2013.01); *H01H 33/664* (2013.01)

(58) Field of Classification Search
CPC .... H01H 33/664; H01H 33/668; H01H 9/168; H01H 2300/03; H02J 50/10; H04Q 9/00
USPC ......................................... 218/122, 121, 123
See application file for complete search history.

(56) References Cited

U.S. PATENT DOCUMENTS

| | | | | |
|---|---|---|---|---|
| 4,163,130 A * | 7/1979 | Kubota | H01H 33/668 | 313/577 |
| 4,440,995 A * | 4/1984 | Lange | H01H 33/668 | 218/122 |
| 6,153,846 A * | 11/2000 | Morita | H01H 33/668 | 218/124 |
| 7,253,630 B1 * | 8/2007 | Zhou | G01R 31/3274 | 324/424 |
| 7,383,733 B2 * | 6/2008 | Mosely | H01H 33/668 | 73/602 |
| 9,870,885 B2 * | 1/2018 | Kovacich | G01N 27/021 | |
| 10,153,112 B2 * | 12/2018 | Schellekens | H01H 33/668 | |
| 2005/0258342 A1 * | 11/2005 | Egermeier | H01H 33/668 | 250/215 |
| 2016/0163483 A1 * | 6/2016 | Gentsch | H01H 33/668 | 324/463 |

* cited by examiner

*Primary Examiner* — William A Bolton

(57) ABSTRACT

A vacuum degree detection device with buried electrodes in a vacuum interrupter and a method thereof are provided. The vacuum degree wireless detection device includes two parts, wherein a first part is provided inside the vacuum interrupter, including buried electrodes, etc., wherein the buried electrodes are welded on an end cover of the vacuum interrupter; a second part is the external detection device after the arc interrupter is processed, including: detection and calculation components, wireless transmitters, rechargeable energy storage batteries, wireless charging coils, etc. The external detection device and the buried electrode structure is designed separately, and the buried structure such as the buried electrodes can be processed as a whole with the vacuum interrupter. During the detection, the external detection device is installed above the buried electrode structure.

7 Claims, 6 Drawing Sheets

VACUUM DEGREE DETECTION DEVICE WITH BURIED ELECTRODES IN VACUUM INTERRUPTER AND METHOD THEREOF

CROSS REFERENCE OF RELATED APPLICATION

The present application claims priority under 35 U.S.C. 119(a-d) to CN 202111054610.6, filed Sep. 9, 2021.

BACKGROUND OF THE PRESENT INVENTION

Field of Invention

The present invention relates to the field of on-line detection of the vacuum degree of a vacuum interrupter, and more particular to a vacuum degree detection device with buried electrodes in a vacuum interrupter and a method thereof.

Description of Related Arts

Due to the advantages of small size, light weight, suitable for frequent operation, and no need for maintenance to extinguish the arc, the vacuum circuit breakers are widely used at present. The vacuum degree in the vacuum interrupter of the vacuum circuit breaker is an important guarantee to ensure the excellent interrupting performance of the vacuum circuit breaker. Therefore, how to detect the vacuum degree in the vacuum interrupter synchronously has become an urgent problem to be solved.

There are many defects and deficiencies in traditional monitoring methods of vacuum degree. Firstly, the structure of the vacuum degree monitoring device is so complicated that it affects the insulation and interrupting performance of the vacuum interrupter itself. Secondly, the traditional vacuum monitoring technology is difficult to achieve real-time online monitoring, and there is usually a lag in time. Thirdly, the power supply problem of the vacuum degree monitoring device has not been well resolved. Finally, the data transmission problem of the vacuum degree detection device also has a technical bottleneck.

SUMMARY OF THE PRESENT INVENTION

In order to solve the problems existing in the above-mentioned conventional arts, the purpose of the present invention is to provide a vacuum degree detection device with buried electrodes in a vacuum interrupter and a method thereof. On the basis of the conventional interrupter structure, buried electrodes are installed, and the miniaturization of the buried electrodes ensures that it will not affect the insulation and interrupting performance of the vacuum interrupter itself, and solves the problems existing in the traditional insulation design. Through the cooperation of the buried electrode and the external detection device, the online monitoring of the vacuum degree inside the vacuum interrupter is realized. The problem of power supply of the detection device is solved by charging the energy storage battery. The problem of data transmission is solved by using a wireless transmitting device. On the basis of theoretical research and experiments, the invention proposes a wireless detection device for the vacuum degree of the buried electrodes inside the vacuum interrupter with industrial application prospects, which can be applied in the field of on-line monitoring of the vacuum degree of the high-voltage vacuum interrupter.

Accordingly, in order to achieve the above object, the present invention adopts technical solutions as follows.

The miniaturization of the electrode ensures that it will not affect the insulation and interrupting performance of the vacuum interrupter itself, which solves the problems existing in the traditional insulation design. Through the cooperation of the buried electrode and the external detection device, the online monitoring of the vacuum degree inside the vacuum interrupter is realized. The problem of power supply of the detection device is solved by charging the energy storage battery. The problem of data transmission is solved by using a wireless transmitting device. On the basis of theoretical research and experiments, the invention proposes a wireless detection device for the vacuum degree of the buried electrodes inside the vacuum interrupter with industrial application prospects, which can be used in the field of on-line monitoring of the vacuum degree of the high-voltage vacuum interrupter.

To achieve the above object, the present invention adopts the following technical solutions:

A vacuum degree detection device with buried electrodes in a vacuum interrupter, wherein:

- the vacuum degree detection device is provided on an end cover of the vacuum interrupter 203, and comprises a buried electrode structure 202 and an external detection device 201;
- the buried electrode structure 202 comprises a ceramic insulator 107, a buried central emitting electrode 108 and a buried receiving electrode 109 that penetrate and are welded on the ceramic insulator 107; ends of the buried receiving electrode 109 are welded with receiving electrode grids 110; a bottom of the ceramic insulator 107 is welded with an inner shield 111 and an outer shield 112 with a hole structure;
- the external detection device 201 is installed after the vacuum interrupter is processed, and comprises: an external detection shell shielding structure 104; a wireless transmitting device 101 fixed on a top of the external detection shell shielding structure 104; and a wireless charging coil 103 welded on the outer wall of the shielding structure 104 of the external detection shell; wherein the wireless charging coil 103 is connected to the charging/storing battery 102 on the inner upper side of the shielding structure 104 of the external detection shell through wires; the charging/storing battery 102 supplies power to a detection and calculation component 105 placed below through the wire; an electrode connection terminal 106 is installed at a lower part of the detection and calculation component 105;
- the detection and calculation component 105 comprises an oscillator, a bridge, a current sensor, a voltage sensor, an integrator, a reference, a buffer, an amplifier and a data processor; wherein the charging/storing battery 102 is followed by an oscillator and bridge connected in sequence, a first end of the bridge is connected to the buried central emitting electrode 108, a second end of the bridge is connected to the buried receiving electrode 109, the bridge and the buried electrode structure 202 form a loop, the current sensor is connected in series in the loop, and the voltage sensor is connected in parallel in the loop; the integrator is connected to the current sensor, the voltage sensor and the reference device; the reference device is connected to the buffer and amplifier, and the data processor in turn; and the external detection device 201 and the buried electrode structure 202 are designed in a separate manner, and all the components included in the buried electrode structure 202 are processed into a whole with the vacuum interrupter; when applying the detection, the electrode connection terminals 106 under the detection and calculation component 105 in the external detection device 201 are matched and installed with the buried central emitting electrode 108 and the buried receiving electrode 109 in the buried electrode structure 202.

Preferably, terminals of the buried central emitting electrode 108 has an axisymmetric multi-pole tip structure, which acts as an electron emitter during the vacuum degree measurement process; the receiving electrode grid 110 at the end of the buried receiving electrode 109 is a cylindrical structure arranged on the periphery of the multi-pole tip structure at the end of the buried central emitting electrode 108, and is used as a receiving electrode for electrons during the measurement process; an amount of buried receiving electrodes 109 is at a range of 2-6; a distance d between the multi-pole tip structure at the end of the buried central emitting electrode 108 and an inner wall of the receiving electrode grid 110 is at a range of 0.01 mm-5 mm.

Preferably, both the inner shield 111 and the outer shield 112 have hole-shaped structures; the inner shield 111 is covered by the outer shield 112; an hole of the inner shield 111 and an hole of the outer shield 112 are in staggered arrangement, and electrons and particles cannot simultaneously pass through the inner shield 111 and the outer shield 112 through linear motion; and Preferably, a material of the inner shield 111 is a magnet-conductive metal material, and a material of the outer shield 112 is a non-magnetic metal material; or the material of the inner shield 111 is a non-magnetic metal material, and the material of the outer shield 112 is a magnet-conductive metal material.

Preferably, the wireless charging coil 103 is in a ring structure or a circular structure; a normal direction of the wireless charging coil 103 is tangent to a concentric circle of the conductive rod of the vacuum interrupter.

Preferably, shapes of the inner shielding cover 111 and the outer shielding cover 112 are cylindrical, spherical, rectangular or elliptical.

Preferably, an installation position of the buried electrode structure 202 is on a static end cover plate or a moving end cover plate of the vacuum interrupter.

The present invention further provides a vacuum degree detection method with the buried electrodes in the vacuum interrupter mentioned above, comprising: during measurement of the vacuum degree, supplying power to the detection and calculation component 105 by the charging/storing battery 102; generating pulse or oscillating voltage waveform through the action of adjusting resistors, oscillators and bridges by the charging/storing battery 102, applying pulse or oscillating voltage waveform generated to the buried central emitting electrode 108 and the buried receiving electrode 109 in the buried electrode structure 202 through the wire; measuring the field emission voltage signal and current signal between the emitting electrode 108 and the buried receiving electrode 109; integrating the field emission energy by the integrator; by the reference device in the detection calculation part 105, performing analog-to-digital conversion on the current signal and voltage signal of the field emission and the energy per unit time of the field emission, and then filtering and amplifying the signal by the buffer and amplifier, and finally comparing and analyzing the signal by the data processor; comparing a standard current waveform and a standard voltage waveform under different vacuum degrees with an energy per unit time of standard field emission to determine the vacuum degree inside the vacuum interrupter; and sending out a signal generated by the data processor through the wireless transmitting device 101.

Compared with the conventional arts, the present invention has the following advantages.

1) The present invention realizes the separation of the buried electrode structure and the external detection device. The buried electrode structure is integrated with the vacuum interrupter, and only one interface is left on the end cover of the interrupter. If testing, install an external testing device. If no detection is carried out, it is no different from the ordinary interrupter, and there will be no additional influence. The miniaturization of the buried electrode structure ensures that the added structure does not affect the insulation and interrupting performance of the vacuum interrupter itself.
2) The present invention realizes wireless charging energy storage measurement, and utilizes wireless charging coils and energy storage batteries to provide electrical energy required for real-time measurement. The charging and energy storage for a period of time enables it to complete the measurement work within a certain period or a certain time.
3) The present invention realizes wireless vacuum degree data transmission. After the measurement is completed, the measurement results are sent out through the wireless transmitting device, so that the primary and secondary sides are completely isolated. Signal shielding and anti-interference work need to be done well.

DETAILED DESCRIPTION OF THE PREFERRED EMBODIMENT

Further description of the present invention is illustrated in detail by combining with the preferred embodiments and the drawings as follows.

Figure 1:
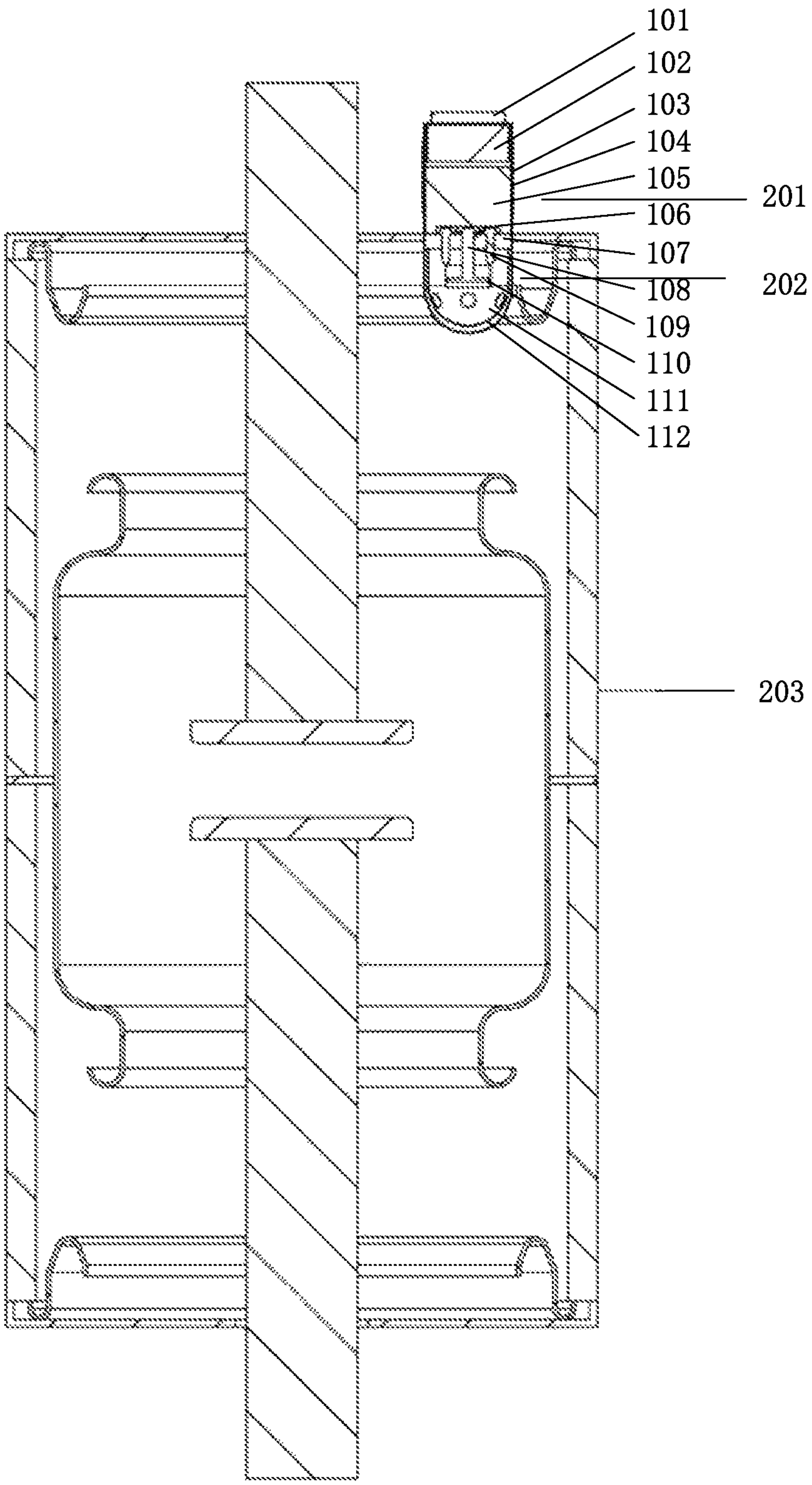
FIG. 1 is an entire cross-sectional view of a vacuum degree detection device with buried electrodes in a vacuum interrupter according to a preferred embodiment of the present invention.
Figure 6:
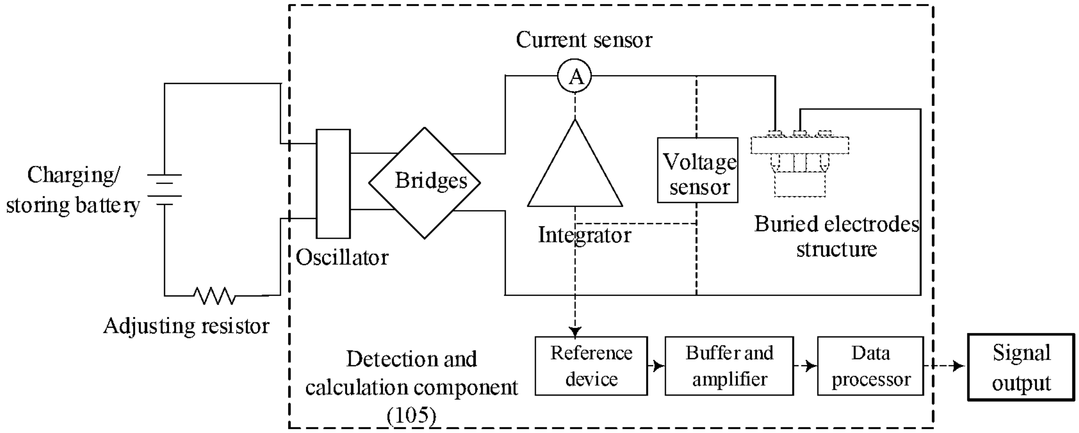
FIG. 6 is a schematic diagram of the composition of the detection and calculation components in the detection device of the present invention.

Referring to FIG. 1, FIG. 1 is an entire cross-sectional view of a vacuum degree detection device with buried electrodes in a vacuum interrupter according to a preferred embodiment of the present invention. The vacuum degree detection device is provided on an end cover of the vacuum interrupter 203, and comprises two parts of a buried electrode structure 202 and an external detection device 201;

wherein a first part is the buried electrode structure 202 comprising a ceramic insulator 107, a buried central emitting electrode 108 and a buried receiving electrode 109 that penetrate and are welded on the ceramic insulator 107; ends of the buried receiving electrode 109 are welded with receiving electrode grids 110; a bottom of the ceramic insulator 107 is welded with an inner shield 111 and an outer shield 112 with a hole structure;

a second part is the external detection device 201 installed after the vacuum interrupter is processed, and comprising: an external detection shell shielding structure 104; a wireless transmitting device 101 fixed on a top of the external detection shell shielding structure 104; and a wireless charging coil 103 welded on the outer wall of the shielding structure 104 of the external detection shell; wherein the wireless charging coil 103 is connected to the charging/storing battery 102 on the inner upper side of the shielding structure 104 of the external detection shell through wires; the charging/storing battery 102 supplies power to a detection and calculation component 105 placed below through the wire; an electrode connection terminal 106 is installed at a lower part of the detection and calculation component 105;

As shown in FIG. 6, the detection and calculation component 105 comprises an oscillator, a bridge, a current sensor, a voltage sensor, an integrator, a reference, a buffer, an amplifier and a data processor; wherein the charging/storing battery 102 is followed by an oscillator and bridge connected in sequence, a first end of the bridge is connected to the buried central emitting electrode 108, a second end of the bridge is connected to the buried receiving electrode 109, the bridge and the buried electrode structure 202 form a loop, the current sensor is connected in series in the loop, and the voltage sensor is connected in parallel in the loop; the integrator is connected to the current sensor, the voltage sensor and the reference device; the reference device is connected to the buffer and amplifier, and the data processor in turn;

the external detection device 201 and the buried electrode structure 202 are designed in a separate manner, and all the components included in the buried electrode structure 202 are processed into a whole with the vacuum interrupter; when applying the detection, the electrode connection terminals 106 under the detection and calculation component 105 in the external detection device 201 are matched and installed with the buried central emitting electrode 108 and the buried receiving electrode 109 in the buried electrode structure 202.

Figure 2:
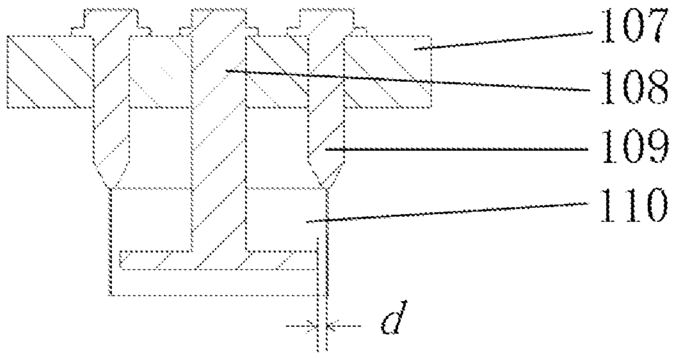
FIG. 2 is a cross-sectional view of the buried electrodes in the vacuum interrupter.
Figure 3:
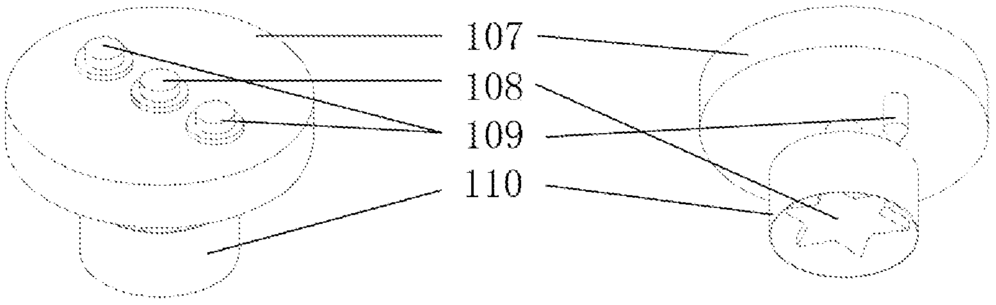
FIG. 3 is a view from different perspectives of the buried electrodes structure in the detection device of the present invention.

FIG. 2 is a cross-sectional view of buried electrodes in the vacuum interrupter. FIG. 3 is a view from different perspectives of the buried electrodes structure in the detection device of the present invention. Terminals of the buried central emitting electrode 108 has an axisymmetric multi-pole tip structure, which acts as an electron emitter during the vacuum degree measurement process; the receiving electrode grid 110 at the end of the buried receiving electrode 109 is a cylindrical structure arranged on the periphery of the multi-pole tip structure at the end of the buried central emitting electrode 108, and is used as a receiving electrode for electrons during the measurement process; an amount of buried receiving electrodes 109 is at a range of 2-6; a distance d between the multi-pole tip structure at the end of the buried central emitter electrode 108 and an inner wall of the receiving electrode grid 110 is at a range of 0.01 mm-5 mm.

Figure 4:
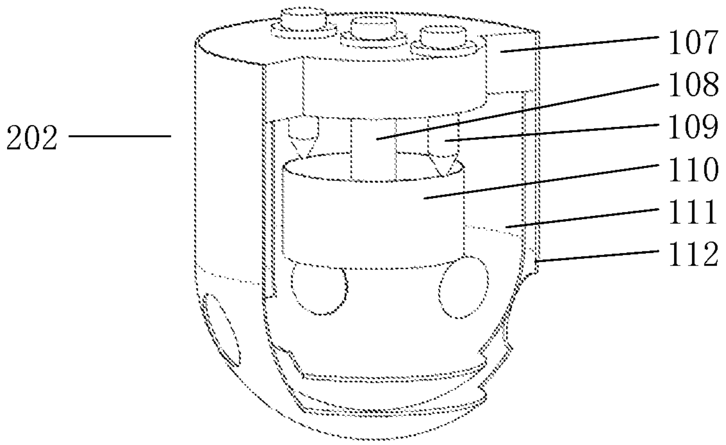
FIG. 4 is a cross-sectional view of the shield structure and the electrode structure in the buried electrode structure of the present invention.

FIG. 4 is a cross-sectional view of the shield structure and the electrode structure in the buried electrode structure of the present invention. Both the inner shield 111 and the outer shield 112 have hole-shaped structures; wherein on the one hand, the function of the hole is to shield the influence of the discharge process between the buried electrodes 107 on the function of the vacuum interrupter, and on the other hand, through the structure of the hole, the vacuum degree inside the shield and the vacuum interrupter is kept consistent. The inner shield 111 has a smaller volume and is covered by the outer shield 112; an hole of the inner shield 111 and a hole of the outer shield 112 are in staggered arrangement, and electrons and particles cannot simultaneously pass through the inner shield 111 and the outer shield 112 through linear motion. A material of the inner shield 111 is a magnet-conductive metal material, and a material of the outer shield 112 is a non-magnetic metal material; or the material of the inner shield 111 is a non-magnetic metal material, and the material of the outer shield 112 is a magnet-conductive metal material. Under this setting, one of the two shielding structures has the magnetic field shielding effect, and the other has the electric field shielding effect. Shapes of the inner shield 111 and the outer shield 112 are cylindrical, spherical, rectangular or elliptical.

Figure 5:
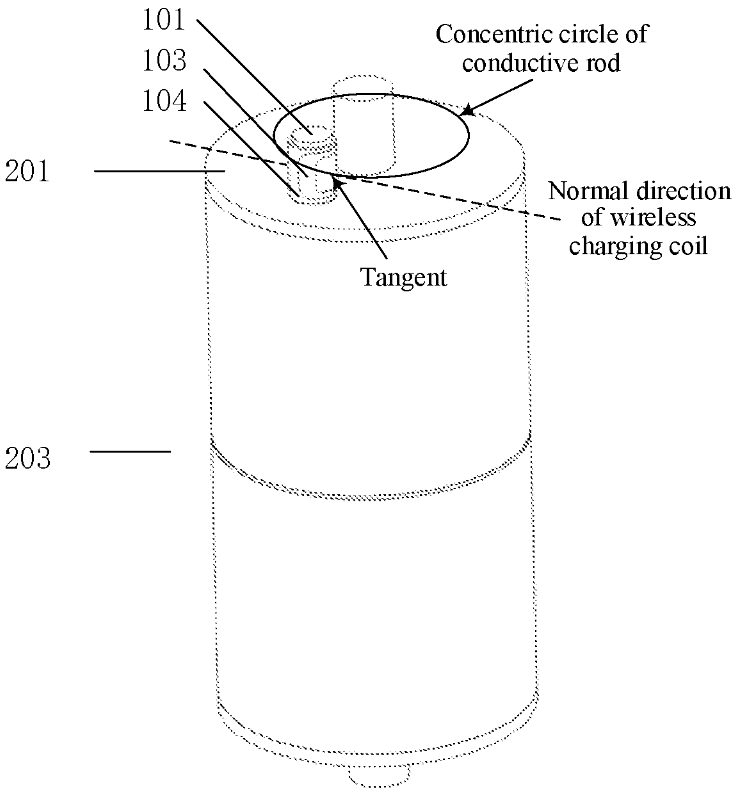
FIG. 5 is a relative position diagram of the wireless charging coil and the vacuum interrupter in the external detection device of the present invention.

FIG. 5 is a relative position diagram of the wireless charging coil and the vacuum interrupter in the external detection device of the present invention. The wireless charging coil 103 is in a ring structure or a circular structure; a normal direction of the wireless charging coil 103 is tangent to a concentric circle of the conductive rod of the vacuum interrupter. Under such a position matching condition, when the conductive rod of the vacuum interrupter passes current, the generated changing magnetic field will make the wireless charging coil 103 have the highest charging efficiency. An installation position of the buried electrode structure 202 is on a static end cover plate or a moving end cover plate of the vacuum interrupter.

As shown in FIG. 6, the present invention further provides a vacuum degree detection method with the buried electrodes in the vacuum interrupter, comprising: during measurement of the vacuum degree, supplying power to the detection and calculation component 105 by the charging/storing battery 102; generating pulse or oscillating voltage waveform through the action of adjusting resistors, oscillators and bridges by the charging/storing battery 102, applying pulse or oscillating voltage waveform generated to the buried central emitting electrode 108 and the buried receiving electrode 109 in the buried electrode structure 202 through the wire; measuring the field emission voltage signal and current signal between the emitting electrode 108 and the buried receiving electrode 109; integrating the field emission energy by the integrator; by the reference device in the detection calculation part 105, performing analog-to-digital conversion on the current signal and voltage signal of the field emission and the energy per unit time of the field emission, and then filtering and amplifying the signal by the buffer and amplifier, and finally comparing and analyzing the signal by the data processor; comparing a standard current waveform and a standard voltage waveform under different degrees of vacuum with an energy per unit time of standard field emission to determine the vacuum degree inside the vacuum interrupter; and sending out a signal generated by the data processor through the wireless transmitting device 101.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A vacuum degree detection device with buried electrodes in a vacuum interrupter, wherein:

the vacuum degree detection device is provided on an end cover of the vacuum interrupter (203), and comprises a buried electrode structure (202) and an external detection device (201);

the buried electrode structure (202) comprises a ceramic insulator (107), a buried central emitting electrode (108) and a buried receiving electrode (109) that penetrate and are welded on the ceramic insulator (107); ends of the buried receiving electrode (109) are welded with receiving electrode grids (110); a bottom of the ceramic insulator (107) is welded with an inner shield (111) and an outer shield (112) with a hole structure;

the external detection device (201) is installed after the vacuum interrupter is processed, and comprises: an external detection shell shielding structure (104); a wireless transmitting device (101) fixed on a top of the external detection shell shielding structure (104); and a wireless charging coil (103) welded on an outer wall of the shielding structure (104) of the external detection shell; wherein the wireless charging coil (103) is connected to a charging/storing battery (102) on an inner upper side of the shielding structure (104) of the external detection shell through wires; the charging/storing battery (102) supplies power to a detection and calculation component (105) placed below through the wires; an electrode connection terminal (106) is installed at a lower part of the detection and calculation component (105);

the detection and calculation component (105) comprises an oscillator, a bridge, a current sensor, a voltage sensor, an integrator, a reference, a buffer, an amplifier and a data processor; wherein the charging/storing battery (102) is followed by the oscillator and bridge connected in sequence, a first end of the bridge is connected to the buried central emitting electrode (108), a second end of the bridge is connected to the buried receiving electrode (109), the bridge and the buried electrode structure (202) form a loop, the current sensor is connected in series in the loop, and the voltage sensor is connected in parallel in the loop; the integrator is connected to the current sensor, the voltage sensor and the reference device; the reference device is connected to the buffer and amplifier, and the data processor in turn;

the external detection device (201) and the buried electrode structure (202) are designed in a separate manner, and the ceramic insulator (107), the buried central emitting electrode (108), the buried receiving electrode (109), the receiving electrode grids (110), the inner shield (111) and the outer shield (112) are processed into an integrated body with the vacuum interrupter; when applying the detection, the electrode connection terminals (106) under the detection and calculation component (105) in the external detection device (201) are matched and installed with the buried central emitting electrode (108) and the buried receiving electrode (109) in the buried electrode structure (202).

2. The vacuum degree detection device with the buried electrodes in the vacuum interrupter, as recited in claim 1, wherein terminals of the buried central emitting electrode (108) has an axisymmetric multi-pole tip structure, which acts as an electron emitter during a vacuum degree measurement process; the receiving electrode grid (110) at the end of the buried receiving electrode (109) is a cylindrical structure arranged on a periphery of the multi-pole tip structure at the end of the buried central emitting electrode (108), and is used as a receiving electrode for electrons during the measurement process; an amount of buried receiving electrodes (109) is at a range of 2-6; a distance d between the multi-pole tip structure at the end of the buried central emitting electrode (108) and an inner wall of the receiving electrode grid (110) is in a range of 0.01 mm-5 mm.

3. The vacuum degree detection device with the buried electrodes in the vacuum interrupter, as recited in claim 1, wherein:

both the inner shield (111) and the outer shield (112) have hole-shaped structures; the inner shield (111) is covered by the outer shield (112); a hole of the inner shielding cover (111) and a hole of the outer shield (112) are in staggered arrangement, and electrons and particles cannot simultaneously pass through the inner shield (111) and the outer shield (112) through linear motion; and a material of the inner shield (111) is a magnet-conductive metal material, and a material of the outer shield (112) is a non-magnetic metal material; or the material of the inner shield (111) is a non-magnetic metal material, and the material of the outer shield (112) is a magnet-conductive metal material.

4. The vacuum degree detection device with the buried electrodes in the vacuum interrupter, as recited in claim 1, wherein the wireless charging coil (103) is in a ring structure or a circular structure; a normal direction of the wireless charging coil (103) is tangent to a concentric circle of a conductive rod of the vacuum interrupter.

5. The vacuum degree detection device with the buried electrodes in the vacuum interrupter, as recited in claim 1, wherein: shapes of the inner shield (111) and the outer shield (112) are cylindrical, spherical, rectangular or elliptical.

6. The vacuum degree detection device with the buried electrodes in the vacuum interrupter, as recited in claim 1, wherein: an installation position of the buried electrode structure (202) is on a static end cover plate or a moving end cover plate of the vacuum interrupter.

7. A vacuum degree detection method with the buried electrodes in the vacuum interrupter, as recited in claim 1, comprising: during measurement of the vacuum degree, supplying power to the detection and calculation component (105) by the charging/storing battery (102); generating pulse or oscillating voltage waveform through an action of adjusting resistors, oscillators and bridges by the charging/storage battery (102), applying pulse or oscillating voltage waveform generated to the buried central emitting electrode (108) and the buried receiving electrode (109) in the buried electrode structure (202) through the wires; measuring a field emission voltage signal and current signal between the emitting electrode (108) and the buried receiving electrode (109); integrating a field emission energy by the integrator; by the reference device in a detection calculation part (105), performing analog-to-digital conversion on the current signal and voltage signal of the field emission and energy per unit time of the field emission, and then filtering and amplifying a signal by a buffer and amplifier, and finally comparing and analyzing the signal by a data processor; comparing a standard current waveform and a standard voltage waveform under different degrees of vacuum with an energy per unit time of standard field emission to determine the vacuum degree inside the vacuum interrupter; and sending out the signal generated by the data processor through the wireless transmitting device (101).

* * * * *